United States Patent [19]

Karsten et al.

[11] Patent Number: 5,476,731
[45] Date of Patent: Dec. 19, 1995

[54] FIELD-REPLACEABLE BATTERY PACK AND METHOD FOR UNDERGROUND INSTALLATIONS

[75] Inventors: Lee Karsten, Thiensville; Brenda Stewart, Milwaukee, both of Wis.

[73] Assignee: Badger Meter, Inc., Milwaukee, Wis.

[21] Appl. No.: 321,283

[22] Filed: Oct. 11, 1994

[51] Int. Cl.⁶ ............................. H01M 2/04; H01M 2/06
[52] U.S. Cl. .................. 429/97; 429/98; 429/99; 429/100
[58] Field of Search ................... 429/96, 97, 98, 429/99, 100, 9

[56] References Cited

U.S. PATENT DOCUMENTS

| | | | |
|---|---|---|---|
| 4,346,151 | 8/1982 | Uba et al. | 429/99 |
| 4,933,988 | 6/1990 | Thibault | 455/349 |
| 5,023,824 | 6/1991 | Chadima, Jr. et al. | 364/708 |
| 5,175,708 | 12/1992 | Dumestre, III | 367/3 |
| 5,224,474 | 7/1993 | Bloomfield | 128/201.19 |

Primary Examiner—Stephen Kalafut
Assistant Examiner—Carol Chaney
Attorney, Agent, or Firm—Quarles & Brady

[57] ABSTRACT

At least one new battery (60, 61) is added to a transponder unit (10) used in a subsurface pit enclosure (11), by removing a transponder housing (25, 26) from the pit enclosure (11), removing a breakout portion (33) of a top wall (32) of the transponder housing (25, 26) to provide an access opening (52) to access a pair of transponder terminals (50, 51) in the transponder housing (25, 26), mounting a battery (60, 61) sealed in a battery casing (62) to a side of the transponder housing (25, 26), with a pair of battery pack leads (47, 48) extending from the battery casing (62), connecting the battery pack leads (47, 48) to the transponder terminals (50, 51) in the transponder housing (25, 26), and providing a sealed battery pack cover (41) over both a top opening (65) in the battery casing (62) and the access opening (32) in the transponder housing (25, 26).

8 Claims, 3 Drawing Sheets

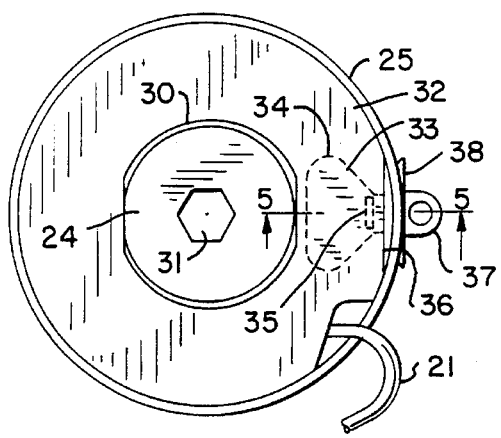
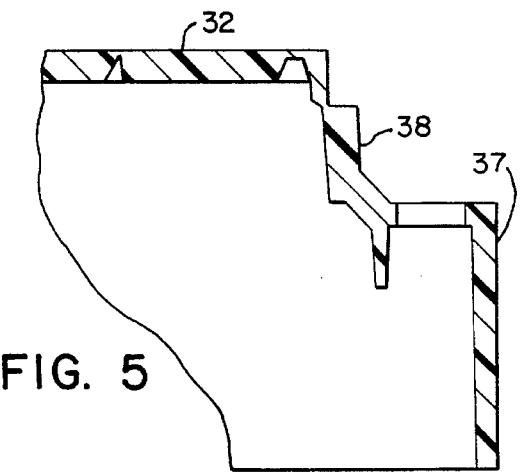
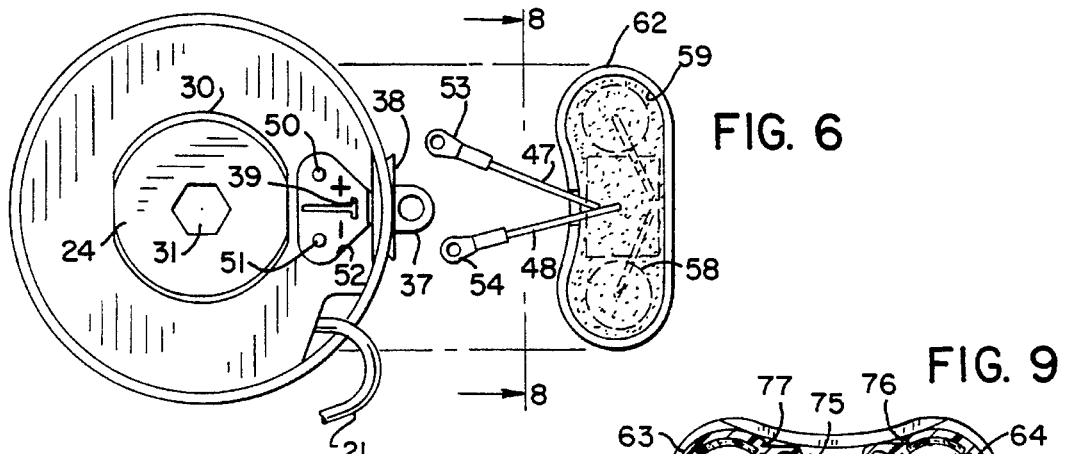
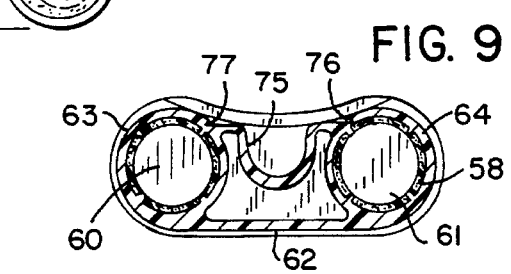
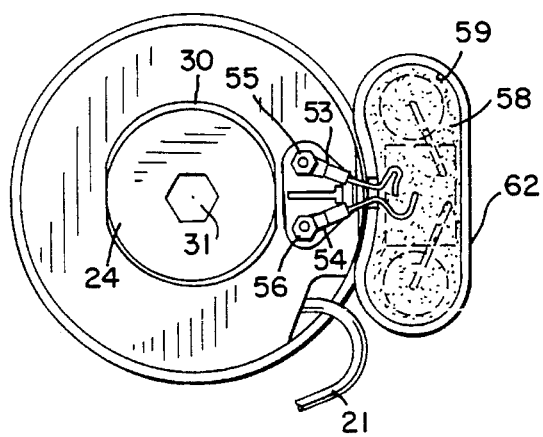
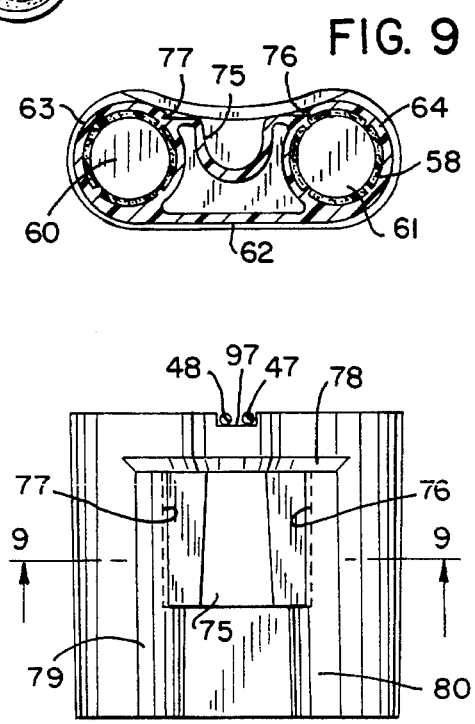

5,476,731

FIELD-REPLACEABLE BATTERY PACK AND METHOD FOR UNDERGROUND INSTALLATIONS

BACKGROUND OF THE INVENTION

1. Field of the Invention

The invention relates to the utility meter reading units and transponders which are located outside of a building in an underground enclosure.

2. Description of the Background Art

In moderate climate zones, utility meters are located in subsurface enclosures in areas adjacent to residences or other dwellings. Such enclosures are referred to as "pits." An example of such an enclosure is illustrated in Cerny et al., U.S. Pat. No. 5,298,894.

In Cerny et al, meter data is transmitted from a transponder unit in an underground pit to an electronic collection unit carried by a meter reading person or by a vehicle.

In Cerny et al., the transponder unit in the pit includes one or more batteries which are installed during manufacture. Eventually, such batteries require replacement. The pit environment may be filled with water. Therefore, a convenient way of handling battery replacement is needed in this rugged environment.

SUMMARY OF THE INVENTION

The invention is incorporated in a battery pack assembly and method of adding a replacement battery for a pit transponder located in a subsurface pit enclosure.

The battery pack assembly is assembled in a casing of water impervious material. At least one battery is disposed in the casing. A pair of leads or other electrical connections are provided for electrically connecting the battery to the pit transponder through an access opening in the pit transponder housing. A material is used to fill the casing for sealing and protecting the battery. A top cover of water impervious material fits over an opening in the casing. The top cover has a portion that extends beyond the battery casing to cover the access opening in the pit transponder housing.

In a preferred embodiment the top cover is an integrally formed member.

In the method of the invention the transponder is removed from the pit enclosure. A breakout portion is removed from a top wall of the transponder housing. At least one battery is sealed in a battery casing with a pair of battery pack leads or other electrical connectors extending therefrom. The battery pack is mounted on a side of the transponder housing. The battery pack leads are connected to the transponder terminals in the transponder housing, and a cover is provided to cover both a top opening in the battery casing and the access opening in the transponder housing.

In the method of the present invention, the original batteries are not removed from the transponder unit.

The sealing of the battery pack with potting material and the sealing around the new cover that is installed provide the unit with the environment-resistant features that permit installation of units in outdoor underground enclosures.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

BRIEF DESCRIPTION OF THE DRAWINGS

FIG. 4 is a top view of a pit transponder housing seen in FIGS. 1, 2 and 3;

FIG. 5 is a fragmentary sectional view taken in the plane indicated by line 5—5 in FIG. 4;

FIG. 6 is a top view illustrating steps in the installation of the battery pack seen in FIGS. 1, 2 and 3; and FIG. 7 is a top view illustrating further steps in the installation of the battery pack seen in FIGS. 1, 2 and 3;

FIG. 8 is a front view in elevation of the battery pack seen in FIGS. 6 and 7;

FIG. 9 is a sectional view taken in the plane indicated by line 9—9 in FIG. 8;

DETAILED DESCRIPTION OF THE PREFERRED EMBODIMENT

Figure 1:
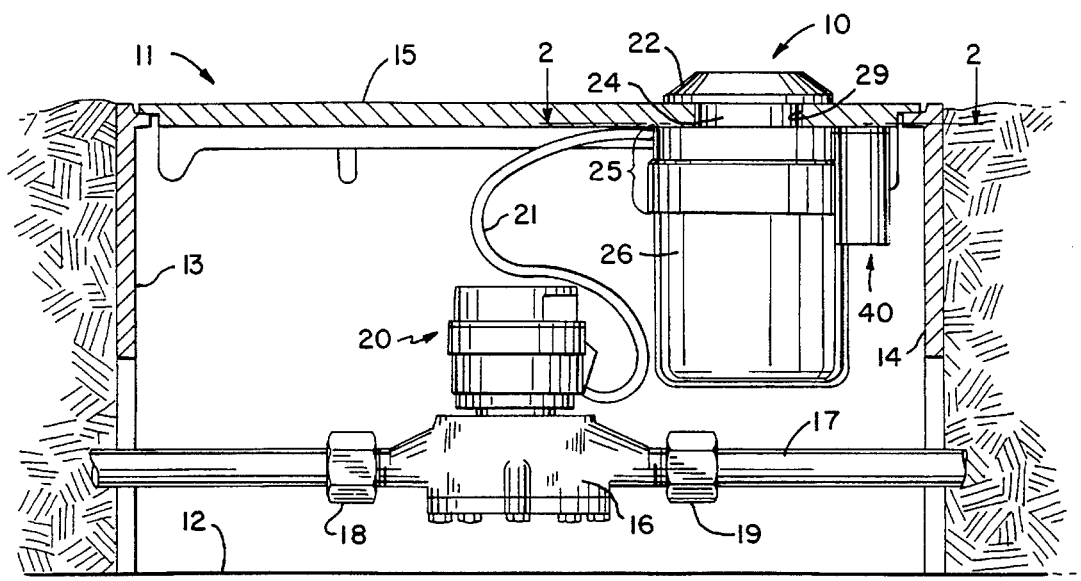
FIG. 1 is a general pictorial illustration showing the environment of the present invention.
Figure 2:
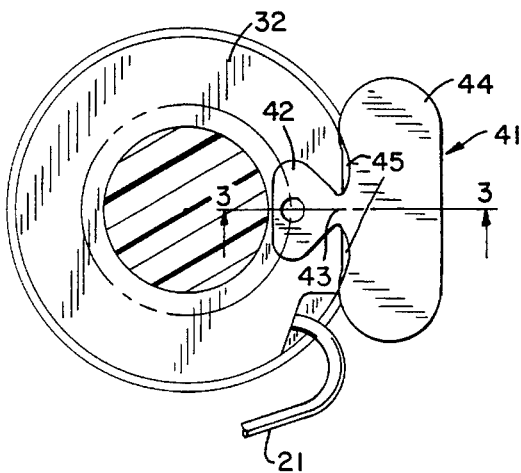
FIG. 2 is a sectional view of taken in the plane indicated by line 2—2 in FIG. 1.

Referring to FIGS. 1 and 2, the invention is incorporated in a battery pack 40 that is attached to a transponder assembly 10, which is located in a subsurface pit enclosure 11. The transponder unit 10 of FIG. 1 communicates via radio waves with a handheld collection unit carried by a meter reading person or a collection unit carried in a vehicle as shown in Cerny et al., cited above.

The pit enclosure 11 is typically made of metal and includes sidewalls 13, 14 and a lid 15 which is removable to open the enclosure for access. A bottom wall 12 is optional. The pit enclosure 11 is installed along the route of water supply pipe 17. A water meter housing 16 is connected in the water supply line 17, using hex-head nuts 18, 19 which are sealed in a conventional manner against leaks at the connecting points. An electronic water meter unit 20 is mounted to the top of the water meter housing 16. The water meter 20 connects via a twisted pair, shielded cable 21 to the transponder unit 10.

The transponder assembly 10 is attached to, and hangs down from the pit lid 15. The transponder housing has a shroud portion 25, which encloses an antenna as described in Cerny et al., cited above. The shroud 25 has a stem 24 which is inserted through an opening 29 in the pit lid 15 and fastened with cap 22 to the pit lid 15. The cap 22 also has a hexagonal opening (not shown) through the center to receive a hex-sided anti-tamper plug (not shown). Stem 24 has flatted sides, a threaded portion 30 and a hex socket 31 on top (FIGS. 4, 6 and 7) to receive the hex-sided anti-tamper plug. The shroud 25 is connected to a lower cylindrical portion 26 of the transponder housing. The cap 22, shroud portion 25, and lower portion 26 are made of a water impervious plastic, for enclosing and protecting the transponder electronics in the pit environment, which may at times, be filled with water.

FIG. 2 shows a top view of a cover 41 for the battery pack 40. The cover is preferably an integrally formed member of water impervious material, however, assemblies of multiple pieces can also be employed. The cover 41 has a triangular insert 42 to fit over an access opening 52 seen in FIG. 6, and an arm 43 extending from the insert 42 to an oval cover portion 44 to enclose the top of the battery pack 40. Small gaps 45 are created between oval cover portion 42 and flat portion of the sidewall of the shroud to receive caulking material after the cover 41 is in place.

Figure 3:
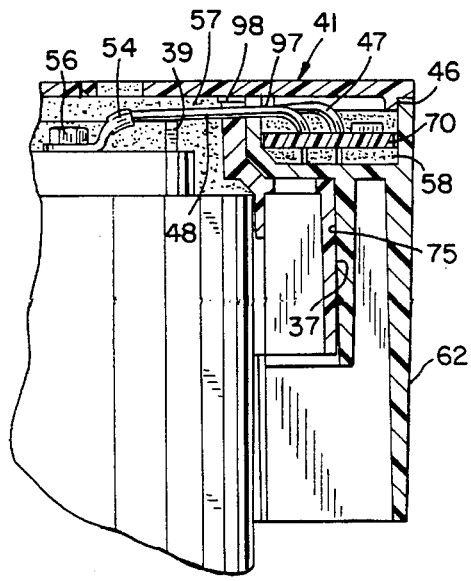
FIG. 3 is a fragmentary sectional view taken in the plane indicated by line 3—3 in FIG. 2.

FIG. 3 shows the details of the connection of the battery pack 40 to the transponder unit 10. As seen in FIG. 1, the battery pack 40 is mounted on one side of the transponder housing 25, 26. The battery pack has a side facing the transponder housing 25, 26, as seen in FIGS. 8 and 9, with curved surfaces, 78, 79 and 80 for abutting the sidewall. A lug 37 of FIGS. 4, 5 and 6 is received in channel 75 and dovetailed edges of a tongue 38 are formed on the side of the shroud 25 and are received in grooves 76, 77 on either side of channel 75. This allows the battery caasing 62 to be mounted on one side of the transponder housing 25, 26 without the use of screws or other separate fasteners.

From the battery pack 40 seen in FIG. 3, insulated leads 47, 48, extend through a slot 97 (FIG. 8) in the wall of the battery pack 40 and a slot 98 (FIG. 3) in the sidewall of the shroud 25. The eye connectors 53, 54 on the ends of the leads 47, 48 are fastened with nuts 55, 56 (FIG. 7) to terminal posts 50, 51 (FIG. 6) inside the transponder housing 25, 26. The area around this connection is filled with caulking material 57 (FIG. 3) after the cover 41 is installed. Cover 41 has a depending rim 46 which snaps just inside the wall of the battery casing 62. Also shown in FIG. 3 is a circuit board 70, which is sealed by caulking material 58 in the battery casing 62.

As seen in FIG. 4, a top wall 32 of shroud 25 has a breakout portion 33 of generally triangular shape outlined by frangible score line 34. One apex is near an outer wall of the transponder housing 25, 26 and has a generally rectangular slot 38 for receiving a screwdriver or other tool for lifting and separating the breakout portion 33. The other two apexes of portion 33 are rounded and positioned inwardly from the outer wall. The sidewall of the shroud 25 has a flat portion 36 slightly inward of the cylindrical sidewall of transponder housing 25, 26 along the apex of the breakout portion 33.

As seen in FIG. 6, when breakout portion 33 is removed, an opening 52 is provided for access to transponder power terminal posts 50, 51. T-shaped barrier wall 39 physically separates and isolates the terminals 50, 51. Also seen in FIGS. 4, 6 and 7 is the twisted pair shielded cable 21 which connects to the meter 20 in FIG. 1. Battery pack 40 is shown with cover 41 removed to exposed caulking material 58 which is used to fill in and around components in the casing 62, which is made of water impervious material.

Figure 10:
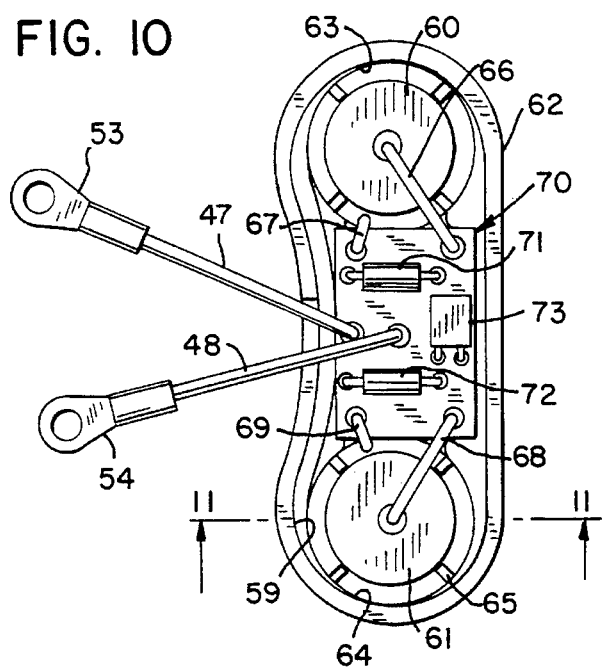
FIG. 10 is a top view of the battery pack seen in FIGS. 6 and 7 before the addition of a potting material.
Figure 11:
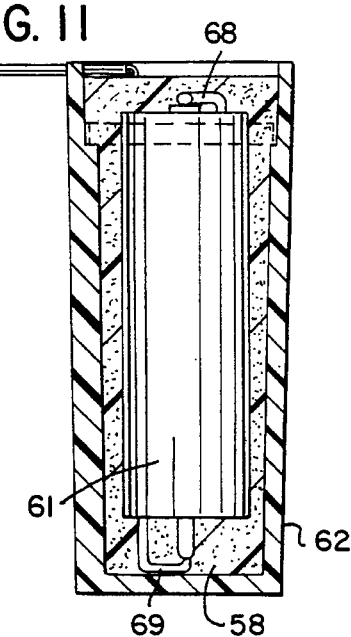
FIG. 11 is a sectional view taken in the plane indicated by line 11—11 in FIG. 10.

FIG. 10 and 11 show details of battery pack 40, including leads 66, 67 and 68, 69 connecting to top and bottom of each respective battery 60, 61, rib spacers 65 along inside walls of two tubes 63, 64 formed in the casing 62 for receiving the batteries 60, 61. The battery pack 40 contains a small circuit board 70 with diodes 71, 72 and a capacitor 73 connected in a circuit such that if one battery 60, 61, is discharged, it will not provide a discharge path for the other battery 60, 61. Sealing material 58, such as GE RTV-162 is added and fills down sides of batteries 60, 61 into bottom of the casing 62. The sealing material 58 also covers top of batteries 60, 61 and the circuit board 70 as seen in FIGS. 6 and 7.

The invention is also capable of use with a single battery pack. One AA-size lithium battery currently provides 4.5 years or service at 70° and as batteries are improved this life is also expected to improve.

Figure 12:
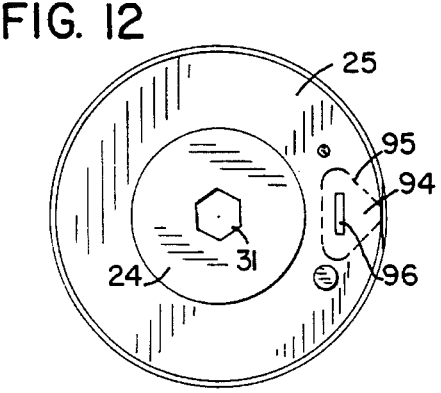
FIGS. 12–14 are top views illustrating a single battery embodiment of the invention.
Figure 13:
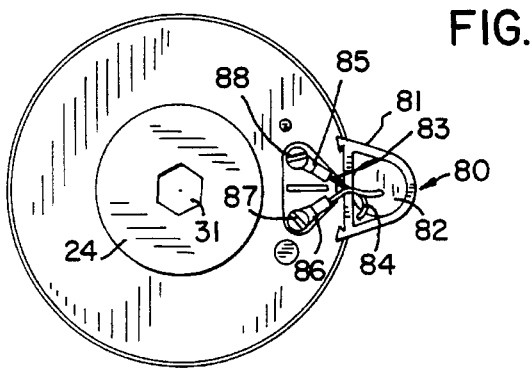
Figure 14:
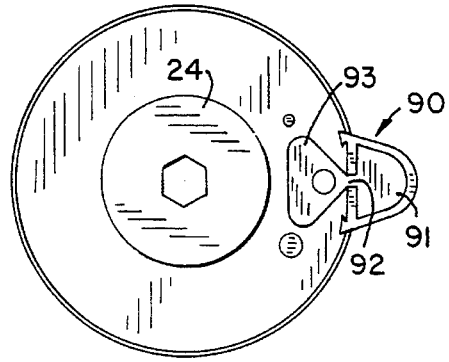
Figure 15:
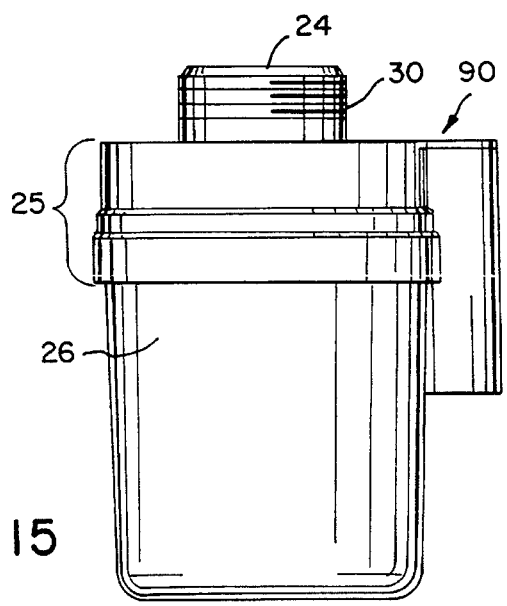
FIG. 15 is a side view in elevation of the embodiment of FIGS. 12–14.

As seen in FIGS. 12–14, a battery pack 80 having a housing 81 containing a single battery 82 can also be mounted onto the sidewall of the transponder housing 25, 26. Again, after a breakout 94 is removed along score line 95 using an implement in slot 96, eye terminals 85, 86 on two battery leads 83, 84 are connected to the isolated terminals using screw fasteners 87, 88. A cover 90 with a portion 91 shaped to cover the top of the battery casing 81 and outwardly tapered walls of the battery casing 81 has an arm 92 which is joined to a triangular insert portion 93 that replaces the breakout portion 94.

In the method of the invention, the replacement battery or batteries is supplied in either the 2-battery pack 40 or single battery pack 80, respectively. In either case, the transponder assembly 10 must be removed from the pit 11 and pit lid 15. Any loose dirt or debris should be removed from the shroud tongue 38 and dovetail edges. Then, the triangular-shaped breakout 33, 94 is removed from the top of the transponder casing 25 using a screwdriver or other tool inserted in slot 35, 96 and is levered upward to separate the breakout 33, 94 along respective score lines 34, 95.

The battery pack 40, 80 is slid downward onto the tongue 38, the vertically disposed edges of tongue 38 being received in grooves 76, 77. The leads 47, 48 or 83, 84 from the battery pack 40 or 80 are connected to the positive and negative terminals in the transponder unit 10. Next, the terminal cover 41, 90 is snapped into place to cover the top opening 59 of the battery pack 40, 80 and the exposed breakout area. Using a caulk gun, a compound 57 such as GE-RTV 162 is injected underneath the cover 41, 90 to fill in the region of the terminals 50, 51 as seen in FIG. 3. The cured RTV 162 can be removed if necessary to make further replacements of the battery pack 40, 80. The transponder 10 is then reset or reprogrammed before replacing it in the pit 11.

This has been a description of two examples of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

We claim:

1. A battery pack assembly for an electrical device located in an enclosure lying below a ground surface, the electrical device being enclosed in a device housing, and the battery pack assembly comprising:

a casing of water impervious material with a top opening for receiving a battery, the casing being formed with means for attaching the casing to the device housing without the use of screws or other separate fasteners;

at least one battery disposed in the casing;

means for electrically connecting the battery to the electrical device through an access opening in a top of the device housing;

a material for sealing over the top opening of the casing and the battery and for sealing over the top opening of the device housing; and a top cover of water impervious material that covers the top opening in the casing, the top cover having a portion that extends laterally beyond the casing to cover the access opening in the device housing.

2. The battery pack assembly of claim 1, wherein the device housing has a cylindrical sidewall and the casing is mounted on a sidewall of said device housing in side-by-side relationship to said device housing.

3. The battery pack of claim 1, wherein said device housing and said battery pack each have a sidewall with a port through which said means for electrically connecting the battery to the electrical device extend from the top opening of the casing to the top opening of the device housing.

4. The battery pack assembly of claim 1, wherein the top cover is an integrally formed member.

5. The assembly of claim 1, wherein the means for attaching the casing to the device housing includes a pair of grooves for receiving a pair of mating dovetails formed on the device housing.

6. The assembly of claim 5, wherein the means for the means for attaching the casing to the device housing further includes a rounded channel for receiving a rounded lug formed on one side of the device housing, said rounded channel being disposed between said pair of grooves.

7. A method for adding a new battery to an electrical device used in a subsurface enclosure, the electrical device being disposed in a device housing, the method comprising the steps of:

removing the device housing from the subsurface enclosure;

removing a breakout portion of a top wall of the device housing to provide an access opening to access a pair of electrical terminals in the device housing;

mounting a battery sealed in a battery casing with a pair of battery pack leads extending therefrom to a side of the device housing;

connecting the battery pack leads to the terminals in the device housing; and providing a sealed battery pack cover over both a top opening in the battery casing and the access opening in the device housing.

8. The method of claim 7, wherein providing a sealed battery further includes the steps of positioning the battery pack cover over the top opening in the battery casing and the access opening in the device housing; and sealing the area of the top opening in the battery casing and the access opening through one or more ports formed by spaces between the battery pack cover and a top wall of the device housing in the region of a sidewall of the device housing.

* * * * *

UNITED STATES PATENT AND TRADEMARK OFFICE
CERTIFICATE OF CORRECTION

PATENT NO.  : 5,476,731

DATED       : December 19, 1995

INVENTOR(S) : Karsten, Lee and Stewart, Brenda

It is certified that error appears in the above-identified patent and that said Letters Patent is hereby corrected as shown below:

Column 1, line 18, "et al," should be --et al.--.

Column 2, line 10, delete "of".

Column 3, line 26, "caasing" should be --casing--.

Column 3, line 59, "exposed" should be --expose--.

Column 3, line 62, "FIG." should be --FIGS.--.

Column 4, line 9, before 70°," "or" should be --of--.

Column 4, line 39, "GE-RTV 162" should be --GE RTV-162--.

Column 4, line 41, "RTV 162" should be --RTV-162--.

Column 5, line 23, delete "the means for".

Signed and Sealed this

Third Day of September, 1996

BRUCE LEHMAN

Attest:

Attesting Officer

Commissioner of Patents and Trademarks